United States Patent [19]

Ruggiero et al.

[11] Patent Number: 5,451,238
[45] Date of Patent: * Sep. 19, 1995

[54] DYE-LEVELING AND CLEANING COMPOSITION CONTAINING AN AQUEOUS ORGANIC SULFONATE PLUS AN ALCOHOL ALKOXYLATE DILUENT

[75] Inventors: Murray A. Ruggiero, East Haven; Robert P. Roth, Cheshire, both of Conn.; Joseph T. Farrell; A. R. Vanover, both of Brandenburg, Ky.

[73] Assignee: Olin Corporation, Cheshire, Conn.

[*] Notice: The portion of the term of this patent subsequent to Nov. 1, 2011 has been disclaimed.

[21] Appl. No.: 242,573

[22] Filed: May 13, 1994

[51] Int. Cl.$^6$ .............................................. C09B 67/18
[52] U.S. Cl. ........................................ 8/567; 8/588; 8/589; 8/576; 8/611; 8/609; 8/602; 8/604
[58] Field of Search .............. 8/137, 567, 588, 115.59, 8/589, 576, 602, 604, 609, 611; 252/545

[56] References Cited

U.S. PATENT DOCUMENTS 5,196,146 3/1993 Farella et al. ...................... 252/542
5,360,457 11/1994 Ruggiero et al. ...................... 8/567

*Primary Examiner*—Margaret Einsmann
*Attorney, Agent, or Firm*—Dale L. Carlson

[57] ABSTRACT

The present invention relates to an acid dye-leveling composition that is useful for imparting a dye-leveling characteristic to fibers, as well as acting as a cleaner for hard surfaces or for fibers. The composition comprises (a) the reaction product of a piperazine compound, a piperazinone compound, an amine compound, or a combination thereof, with an alkyl diphenyl ether sulfonic acid, and (b) an alcohol alkoxylate.

7 Claims, No Drawings

DYE-LEVELING AND CLEANING COMPOSITION CONTAINING AN AQUEOUS ORGANIC SULFONATE PLUS AN ALCOHOL ALKOXYLATE DILUENT

FIELD OF THE INVENTION

The present invention relates generally to new compositions that are useful as dye-leveling agents, and more specifically to a dye-leveling composition comprising a combination of a piperazine-, piperazinone-, or amine-substituted organosulfonate plus an alcohol alkoxylate diluent.

BACKGROUND OF THE INVENTION

Acid dyes applied to polyamide, nylon and wood fibers have a tendency to dye at the point of initial contact. The rapid reaction between the dye and the fiber at the point of initial contact, can cause an uneven appearance or coloration to develop in the dyed fiber. This problem can be exacerbated when several dyes are used to produce a desired shade on the fiber, typically compounding the uneven coloration problem. In addition, the dyes may react at different rates to produce a separation of colors on the fiber. To alleviate this problem, a variety of materials, so-called "dye-leveling agents", have been used to produce a level dye application. These dye-leveling agents, are typically surfactants selected from anionic, cationic, nonionic, and amphoteric classes of surfactants, with anionic being the most common form.

Thus, dye leveling agents are used in the process of dyeing fibers, such as nylon, wool and silk in order to give an even coverage by the dye on the fiber being dyed. Anionic surfactants such as alkyl diphenyloxide disulfonate (commercially available under the trademark DOWFAX 2A1, a product of Dow Chemical Corp.), are typically used as leveling agents. An inherent disadvantage of using these products is that they tend to be poor wetters and high foamers. The wetting ability of the dye bath is particularly important when dyeing nylon fibers which have been treated with a fluorochemical. To alleviate these wetting and foaming problems, auxiliary wetting agents and defoaming agents are typically added to the dye bath. In addition to the cost of these auxiliary agents, their use can increase the chance of mixing and measuring errors, as well as increase the inventory requirement of chemicals needed either as part of the mixing operation or to correct measurement errors that occur.

New dye-leveling compositions, that are easy to formulate and avoid the foaming and wetting problems of the above-discussed prior art compositions, would be highly desired by the fiber dyeing community. The present invention provides one such composition.

A common problem encountered when dyeing natural and/or synthetic fibers, such as wool fibers or polyamide fibers, is the tendency of the dye to provide uneven coloration of the fiber. In essence, the dye more rapidly reacts at the point of initial contact with the fiber, thus giving an uneven appearance to the dyed fiber. This problem is accentuated when several dyes are utilized to produce a desired shading on the fiber. For example, the dyes may react at different rates to produce a separation of colors, causing a variation in shading at different points along the fiber and resulting in what is commonly referred to as "poor shade depth".

To alleviate the above problems, various materials have been suggested in the past to provide level fiber dyeing. These materials, commonly referred to as "dye-leveling agents", have in the past frequently contained anionic surfactants, such as alkyl diphenyloxide disulfonate. By way of illustration, alkyl diphenyloxide disulfonate has been used commercially as an acid dye-leveling agent. However, this disulfonate has the disadvantage of providing higher foaming and poorer wetting (as measured by a draves wetting test) than might be desired, as well as being limited in its usefulness to a relatively narrow pH range. In addition, as demonstrated in Comparative Example A, at column 8, lines 55–67 of U.S. Pat. No. 5,030,245, a dye-leveling agent consisting essentially of such an alkyl diphenyloxide disulfonate (which in that example was DOWFAX 2A1 alkyl diphenyloxide disulfonate, a product of Dow Chemical Company), did not result in a full dye shade development in the dyeing of nylon carpet. Further, alkyl diphenyloxide disulfonate surfactants such as DOWFAX 2A1 surfactant tend to contribute to poorer fiber wetting by the dye bath composition and higher foaming in the dye bath than otherwise might be desired. Accordingly, the search has continued for improved dye-leveling compositions that do not suffer from these poor wetting and high foaming problems.

The prior art is replete with various attempts to provide good dye-leveling agents to the carpet dyeing industry. By way of illustration, the above-mentioned '245 patent discloses a combination dye-leveling agent/stainblocker comprising a polycarboxylated linear alcohol alkoxylate as the dye-leveling agent and a sulfonated phenol-formaldehyde diphenylsulfone condensate as the stainblocker, alone or together with an alkoxylated linear alcohol alkoxylate as a wetting agent. Although these compositions provide good dye-leveling in use with acid dyestuffs, there is still a need in the dyeing industry for further improvement.

As another illustration, U.S. Pat. No. 3,592,584 discloses a dyeing composition for polyamide fibers comprising a combination of a premetallized dye and a dyeing assistant selected from the group consisting of dodecylbenzene sulfonic acid, diethanolamine, and disodium dodecyldiphenylether disulfonate. However, these compositions have proved less effective in providing streak-free, even dyeings of fibers than might be desired.

As yet another illustration, German Offen. DE1919120 describes alkyl diphenylether disulfonate together with an ethoxylate quaternary ammonium compound as pretreatment for improved dyeing of synthetic polyamide fibers.

New dye-leveling agents that are low in foaming and provide good fiber wetting, and are useful in facilitating level dyeing and good shade depth development during the fiber dyeing process, would be highly desired by the fiber dyeing community. If such new dye-leveling agents are usable in conjunction with a wide variety of dyestuffs for dyeing a variety of natural and synthetic fibers, such as wool, silk, and polyamide, these dye-leveling agents would be particularly advantageous to the fiber dyeing industry.

Heretofore, piperazine-substituted, piperazinone-substituted and amine-substituted organosulfonates have not been employed in any dye-leveling compositions for fibers to the knowledge of the present inventors, much less those compositions of the present invention, as described hereinbelow. Certain 2-piperazinones (which contain keto-substitution on the ring) are disclosed in a simple admixture with an alkylated diphenyl oxide sulfonate surfactant, as illustrated by the disclosures of U.S. Pat. No. 5,196,146, but this patent does not disclose piperazinone-substitution on the sulfonates disclosed therein, and the present inventors have found that a simple admixture does not produce such substitution.

New cleaning and/or dye-leveling compositions that provide excellent surface wetting and cleaning or dye-leveling performance characteristics would be highly desired by the user. The present invention provides one such composition.

SUMMARY OF THE INVENTION

In one aspect, the present invention relates to an aqueous dye-leveling composition concentrate comprising:

(a) a dye-leveling agent selected from the group consisting of piperazine-, piperazinone-, and amine-substituted organosulfonates, and combinations thereof, (b) an alcohol alkoxylate diluent, or a combination thereof, and (c) water, wherein the amount of component (a) is between about 40% and about 80% (preferably between about 70% and about 80%), the amount of component (b) is between about 10% and about 55% (preferably between about 30% and about 50%), and the amount of component (c) is between about 2% and about 20% (preferably between about 2% and about 10%), all percents being by weight based upon the weight of the aqueous dye-leveling composition concentrate.

In another aspect, the present invention relates to a "working" composition comprising the above-described concentrate and added water, wherein said concentrate is present in said composition in an amount of between about 0.01 weight percent and about 50 weight percent, based upon the weight of said composition.

In yet another aspect, the present invention relates to a composition comprising (and advantageously consisting essentially of):

(a) the reaction product of a piperazine compound, a piperazinone compound, an amine compound, or a combination thereof, with an alkyl diphenyl ether sulfonic acid, and (b) an alcohol alkoxylate (preferably a linear alcohol alkoxylate).

In still another aspect, the present invention relates to a composition useful for dyeing fibers comprising (a) a dye and (b) a dye-leveling agent comprising (and advantageously consisting essentially of):

(i) the reaction product of a piperazine compound, piperazinone compound, amine compound, or a combination thereof, with an alkyl diphenyl ether sulfonic acid, and (ii) an alcohol alkoxylate (preferably a linear alcohol alkoxylate).

In yet another aspect, the present invention relates to a process for preparing a dye-leveling composition which comprises the steps of:

(a) reacting piperazine compound selected from the group consisting of 1,2-aminoethyl piperazine, 1,4-piperazinediethane sulfonic acid, anhydrous piperazine, hydrated piperazine, and combinations thereof, with an aralkyl ether sulfonate to provide a piperazine-substituted aralkyl ether sulfonic acid, (b) contacting said piperazine-substituted aralkyl ether sulfonic acid with an alcohol alkoxylate diluent to provide a diluent-containing dye-leveling composition.

In still another aspect, the present invention relates to a cleaning composition for cleaning fibers or hard surfaces comprising (a) a base fluid medium comprising water or an organic solvent, or a combination thereof, and (b) a cleaning agent comprising (and advantageously consisting essentially of):

(i) the reaction product of a piperazine compound, a piperazinone compound, an amine compound, or a combination thereof, with an alkyl diphenyl ether sulfonic acid, and (ii) an alcohol alkoxylate (preferably a linear alcohol alkoxylate).

In yet another aspect, the present invention relates to a process for cleaning fibers or a hard surface which comprises contacting said fibers or said hard surface with a cleaning composition comprising (a) a base fluid medium comprising water or an organic solvent, or a combination thereof, and (b) a cleaning agent comprising (and advantageously consisting essentially of):

(i) the reaction product of a piperazine compound, a piperazinone compound, an amine compound, or a combination thereof, with an alkyl diphenyl ether sulfonic acid, and (ii) an alcohol alkoxylate (preferably a linear alcohol alkoxylate).

These and other aspects will become apparent upon reading the following detailed description of the invention.

DETAILED DESCRIPTION OF THE INVENTION

The present inventors have surprisingly discovered an enhanced dye-leveling and cleaning composition that provides an excellent combination of performance efficacy and wetting of the fiber or hard surface substrate being treated. In addition to performing the dye-leveling function, the compositions of the present invention provide built-in wetting efficacy, a particularly advantageous characteristic in the continuous dyeing of nylon carpet where residence time available during the wet-out and dye applicator stages is typically minimal.

It has now been surprisingly found in accordance with the present invention that a dye-leveling composition comprising (and advantageously consisting essentially of) a multi-component mixture of anionic and nonionic surfactants provides extraordinary fiber surface wetting characteristics, as measured by draves wetting test values as compared to a commercial disulfonate dye leveling agent, namely POLY-TERGENT ® 2A1 surfactant, and does not cause excessive foaming when incorporated into a dye-bath formulation. The multi-component mixture has surprisingly also been found to be useful as a cleaning agent when employed in fiber cleaning compositions.

The composition concentrate useful in the present invention suitably contains, in addition to a small amount of water, at least two significant components, namely component (a) a piperazine-substituted, piperazinone-substituted, or amine-substituted organosulfonate, and component (b) an alcohol alkoxylate. Although it is difficult or impossible to reduce the water content of the composition concentrate to zero, apparently due to the formation of an azeotropic mixture, the amount of water in the concentrate is suitably reduced or minimized utilizing a suitable water separation technique, such as azeotropic distillation, or rotary evaporation (utilizing a separator such as a ROTOVAPOR, as described in Example 3 hereinbelow).

An optional defoamer is suitably employed if desired in order to minimize the likelihood of any foaming of the dyeing composition. The concentrate is suitably diluted to provide a "working composition" that lends itself for use either as a hard surface cleaner or as a dye-leveling agent in a dye-bath formulation, or as a fiber cleaner suitable for use as a rug cleaner and/or spot remover for a wide variety of types of carpets (e.g., wool, nylon, silk, and the like), or other fiber-containing material. Further, the dye-leveling composition is suitable for use not only in acid dye baths, but also in neutral pH or basic pH dye baths, such as emulsion dyestuffs, as well as a hard surface cleaner for cleaning hard surfaces, such as concrete, tile, formica, marble, and the like.

Component (a), the substituted organosulfonate, is suitably produced by reacting, for example, an aralkyl ether sulfonic acid with a piperazine compound, a piperazinone compound, an amine compound, or a combination thereof. Particularly advantageous aralkyl ether sulfonates are those selected from the group consisting of alkylated diphenyl oxide sulfonates having at least one alkyl-substitution on a phenyl ring and wherein said alkyl-substitution is selected from the group consisting of linear, branched, and cyclic alkyl substitutions, and combinations thereof. Preferred piperazine compounds are those selected from the group consisting of: 1,2-aminoethyl piperazine, 1,4-piperazinediethane sulfonic acid, anhydrous piperazine, hydrated piperazine, and combinations thereof. Preferred piperazinone compounds are those selected from the group consisting of the 2-piperazinones, more preferably 4-(2-hydroxyethyl)-2-piperazinone, N,N-dimethyl-2-piperazinone and combinations thereof. Preferred amine compounds are those selected from the group consisting of monoethanolamine, triethanolamine, ammonium hydroxide, and combinations thereof.

During use as a dye-leveling agent, component (a) assists in imparting good dye-leveling efficacy to fibers during use. Although not wishing to be bound by any particular theory, it is believed that component (a) assists in (1) controlling the transfer of dye off and on fiber, and (2) controlling the rate of dyeing to give an even appearance of dye shade throughout the fiber, during use of the composition of the present invention in treating fibers.

Particularly advantageous for use in preparing component (a) described above are the alkylated diphenyl oxide sulfonate anionic surfactants corresponding to the following formula or to a mixture of compounds corresponding to the following formula:

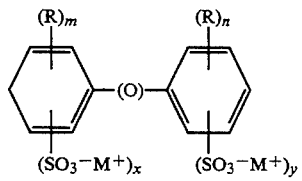

wherein each R is independently a saturated alkyl or substituted saturated alkyl radical or an unsaturated alkyl or substituted unsaturated alkyl radical each m and n is independently 0, 1 or 2; each M is independently hydrogen, an alkali metal, an alkaline earth metal, or ammonium or substituted ammonium; and each x and y are individually 0 or 1. Preferably, each R group is independently an alkyl group having from about 8 to about 24 carbon atoms, even more preferably about 10 to about 20 carbon atoms, and most preferably about 12 to about 16 carbon atoms, with 16 carbon atoms being especially preferred. The alkyl groups can be linear, branched or cyclic, with linear or branched radicals being preferred. The M+ ammonium ion radicals are of the formula $(R')_3NH+$ wherein each R' is independently hydrogen, a $C_1$-$C_4$ alkyl or a $C_1$-$C_4$ hydroxyalkyl radical. Illustrative $C_1$-$C_4$ alkyl or hydroxyalkyl radicals include methyl, ethyl, propyl, isopropyl, butyl, hydroxymethyl and hydroxyethyl. Typical ammonium ion radicals include ammonium $(N+H_4)$, methylammonium $(CH_3N+H_3)$, ethylammonium $(C_2H_5N+H_3)$, dimethylammonium $((CH_3)_2N+H_2)$, methylethylammonium $(CH_3N+H_2C_2H_5$, trimethylammonium $((CH_3)_3N+H)$ dimethylbutylammonium $((CH_3)_2N+HC_4H_9$ hydroxyethylammonium $(HOCH_2CH_2N+H_3)$ and methylhydroxyethylammonium $(CH_3N+H_2CH_2CH_2OH)$. Preferably, each M is hydrogen, sodium, calcium, potassium or ammonium.

Alkylated diphenyl oxide sulfonates and their methods of preparation are well-known and reference is made thereto for the purposes of this invention. Representative methods of preparation of sulfonates are disclosed in U.S. Pat. Nos. 3,264,242; 3,634,272; and 3,945,437. Commercial methods of preparation of the alkylated diphenyl oxide sulfonates generally do not produce species which are exclusively monoalkylated, monosulfonated, dialkylated or disulfonated. The commercial available species are predominantly (greater than 90 percent) disulfonated and are a mixture of mono- and dialkylated with the percentage of dialkylation being about 15 to about 25 and the percentage of monoalkylation being about 75 to 85 percent. Most typically, the commercially available species are about 80 percent monoalkylated and 20 percent dialkylated.

Two illustrative commercially available solutions containing alkylated diphenyl oxide sulfonate surfactants are DOWFAX ® 8390 and DOWFAX ® 8390A surfactants, trademarked products of The Dow Chemical Company. In each, the alkyl group R is predominantly a hexadecyl ($C_{16}$) group. DOWFAX ® 8390A typically contains about 25 percent of the acid forms of the surfactant, that is, in which M is hydrogen. DOWFAX ® 8390 surfactant typically contains about 35 percent of the sodium salts of the surfactant, that is, in which M is sodium. DOWFAX ® 8390A solution fully or partially neutralized with ammonium hydroxide is also suitable for use in the present invention.

The alkylated diphenyl oxide sulfonate compound is suitably reacted with the piperazine compound to produce the desired piperazine, piperazinone, or amine salt using a molar ratio of sulfonate compound to piperazine, piperazinone, or amine compound of between about 10:1 and about 1:10, preferably between about 2:1 and about 1:2.

Component (b), namely the alcohol alkoxylate, is suitably selected from a wide range of such compounds, as disclosed, for example, in U.S. Pat. No. 3,956,401. Illustrative linear alcohol alkoxylates are shown by the formula:

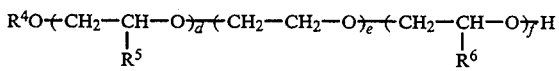

wherein

R[4] is a linear, alkyl hydrocarbon having, for example, an average of from about 7 to about 10 carbon atoms, R[5] is a linear, alkyl hydrocarbon of about 1 to about 4 carbon atoms, R[6] is a linear, alkyl hydrocarbon of about 1 to about 4 carbon atoms, d is an integer of about 1 to about 6, e is an integer of about 4 to about 15, and f is an integer of about 4 to about 25.

Useful linear alcohol alkoxylates are commercially available, for example, under the registered trademark POLY-TERGENT SL-42, a product of Olin Corporation. If desired, the alcohol alkoxylate is suitably end-capped with a lower alkyl group, and such a product is commercially available as POLY-TERGENT SLF-18, a propylene oxide capped linear alcohol alkoxylate that is also a product of Olin Corporation, and these end-capped linear alcohol alkoxylates have been found by the present inventors to provide desirably low foaming during use. Also advantageous for use in accordance with the present invention is a surfactant within the group commercially available as POLY-TERGENT SLF-18B series surfactants, which are surfactants characterized by enhanced biodegradability and are also products of Olin Corporation, which are alkene oxide capped linear alcohol alkoxylates, containing ethylene oxide moieties in the backbone, and suitably also containing at least one propylene oxide moiety in the backbone, as disclosed, for example, in U.S. Pat. Nos. 4,925,587 and 4,898,621. Use of the POLY-TERGENT SLF-18 and/or POLY-TERGENT SLF-18B surfactants to comprise the diluent (component (b)) in accordance with the present invention has been found by the present inventors to avoid the need for an antifoaming agent in the concentrates and working compositions of the present invention.

Nonionic surfactants useful as component (b) include Tergitol XL-80N surfactant, a trademarked product of Union Carbide Chemicals and Plastics Technology Corp., Danbury, Conn. Tergitol XL-80N is a mixture of $C_8$-$C_{10}$ ethoxylated and propoxylated primary alcohols having an average molecular weight of approximately 420. The mixture decomposes rather than boils upon heating, and has a flash point of 425° F. (Cleveland open cup ASTM D 92.218 C). It has a freezing point of $-3°$ C, a specific gravity of 0.98 at 20° C. and is a cloudy liquid which is fully soluble in water.

Commercially available nonionic surfactants useful as component (b) include NEODOL® 91-6 surfactant, a trademarked surfactant product of Shell Chemical Company, Geismar, La. NEODOL® 91-6 surfactant is a detergent range mixture of $C_9$-$C_{11}$ linear primary alcohol ethoxylates having an average of 6 moles of ethylene oxide per mole of alcohol. NEODOL® 91-6 is a slightly viscous liquid having a pour point of 45° F. and a melting point of 42°-48° F. Its solubility in water is complete, although at high concentrations the product may form a gel with water. NEODOL® 91-6 surfactant contains less than 6 parts per million ethylene oxide. NEODOL® 91-6 surfactant possesses a hydroxyl number of 126-140 milligrams potassium hydroxide per gram.

While these commercially-available surfactants are suitable for use as component (b) in the present invention, other surfactants within a wide range of molecular weights can also be successfully employed a component (b) in aqueous or organic solvent solution. For example, surfactants with linear $C_9$-$C_{11}$ carbon chains and five or six EO or PO groups are expected to provide desirable results.

An antifoaming agent (also referred to herein as a "defoaming agent" or "defoamer") is optionally employed in accordance with the process of the present invention. The antifoaming agent is suitably incorporated into either the concentrate or the working composition in accordance with the present invention since foaming can sometimes occur either by virtue of agitation of the formulation during fiber dyeing or fiber cleaning with the "working" composition, or during dilution or mixing encountered during the preparation or use of the concentrate. The degree of foaming depends to a large extent upon the specific compounds selected for components (a) and (b), as well as upon the physical method employed for fiber dyeing, fiber cleaning or concentrate dilution. Illustrative defoamers include silicon oils, mineral oils, modified alcohol ethoxylate, EO/PO block copolymers, phosphate ester, hydrophobic silica, and Fatty alcohols as well as blends of these defoamers. Other useful antifoaming agents include liquid silicone emulsions manufactured and sold by Dow Corning Corporation (Midland, Mich.) under its trademarks "DOW CORNING® X2-1410 ANTIFOAM" and "DOW CORNING® X2-2210 ANTIFOAM". The antifoaming agent should be selected and employed at a concentration such that the detergency of the surfactant(s) and the corrosion inhibition of the 2-piperazinone are not unduly reduced. The antifoaming agent, if used, is desirably employed in the formulation at a concentration of 0.01 to 2 percent by weight, preferably at about 0.02 percent by weight. The concentration of the defoaming agent in the concentrate will be 5 to 20 times greater than in the working composition.

In accordance with the present invention, the fibers are either dye-leveled and dyed simultaneously from a single bath containing both the dye leveling agent and the dye, or the fibers can be pretreated with the dye-leveling agent prior to the dyeing step. The pH of the composition concentrates and the working compositions for dye-leveling can vary over a wide range, although pHs of between about 5 and about 9, preferably between about 6 and about 9, are particularly advantageous.

Although the dye-leveling agents of the present invention are suitably employed with a wide variety of dyes, they are particularly suitable for use in conjunction with acid dyes or dispersed (or so-called "emulsion") dyes. The acid dyes are well-known in the art, and are also referred to herein as "acid dyestuffs". These acid dyes are typically applied to polyester fibers or polyamide-containing natural or synthetic fibers such as nylon, wool, and silk. Suitable fiber materials made from synthetic polyamide, which can be dyed using the process according to the invention, are, e.g., condensation products from hexamethylenediamine and adipic acid (Polyamide 6.6) or sebacic acid (Polyamide 6.10) or mixed condensation products, e.g. from hexamethylenediamine, adipic acid and E-caprolactam (Polyamide 6.6/6), also the polymerization products from E-caprolactam, known under the tradenames of Polyamide 6, "Perion" "Grilon" or "Enkalon" or w-aminoundecanoic acid (Polyamide 11 or "Rilsan"). These fibers can be treated with the compositions of the present invention at any stage of processing, that is to say, e.g. in the form of threads, yarns, knitted goods, and fabrics.

The dye-leveling composition (also referred to herein as the "dye-leveling agent") useful in accordance with the present invention is typically applied to the fiber in a "dye-leveling effective amount". As used herein, the term "dye-leveling effective amount" designates an amount sufficient to provide an even dye appearance on the fiber upon application of dye to the fiber. Preferably, the dye-leveling agent is applied to the fiber in an amount of between about 0.5 and about 5 weight percent (preferably between about 1 and about 4 weight percent) based upon the total weight of the goods being dyed.

The dye-leveling agent of the present invention is suitably employed in the presence or absence of a solvent. Suitable solvents, if used, include alcohols, glycol or ether, such as methanol, butanol, diethylene glycol, tetrahydrofuran, or propylene glycol monoethyl ether or the like. If used, the solvent is employed in an amount of between 10 and about 50 weight percent (preferably between 10 and 40 weight percent) based upon the total weight of the formulation.

Acid dyestuffs, suitable for use in accordance with the invention, can belong to very diverse classes of dyestuffs. These can be, for example, the commercially important dyestuff classes of the azo, anthraquinone, phthalocyanine, nitro, or formazane dyestuffs which can also contain metals bound in complex linkage such as copper, nickel, chromium, or cobalt. Suitable azo dyestuffs are, principally, monoazo dyestuffs, e.g. of the type phenylazobenzene, phenylazonaphthalene, phenylazohydrox- or aminopyrazole, phenylazoacyloacetyl-arylamide, or those of the analogous naphthylazo series, whereby the aromatic nuclei can be suitably substituted. Also suitable are bis- and polyazo dyestuffs. The azo dyestuffs, to which also belong the formazane dyestuffs, can be metallized, principally by chromium or cobalt, but also by copper or nickel, whereby 1 or 2 dyestuff molecules per metal ion participate in the complex.

Typically, the dye is utilized in a "dye effective amount" i e an amount sufficient to cause a desired coloration of the fiber. Preferably, the dye is used in an amount of between about 0.1 and about 10.0 weight percent, based upon the total weight of the goods being dyed.

The reaction conditions employed in fabricating the compositions and composition concentrates of the present invention and the present process should not be limited to any particular conditions. It is preferred to carry out the reaction steps at a temperature of between about 25° C. and about 150° C. Reaction pressure can be selected as desired. Typically, super- or sub-atmospheric reaction pressure is not necessary for the reactions employed in the processes of the present invention. Atmospheric pressure is preferred in order to avoid the expense of special reaction vessels. However, elevated pressures can be used, if desired, and these superatmospheric pressures of up to 10 atmospheres or higher are suitably utilized if desired.

The following examples are intended to illustrate, but in no way limit the scope of, the present invention.

EXAMPLES

The following examples were carried out in order to demonstrate the efficacy of the compositions of the present invention as dye-leveling compositions in the dyeing of fibers. All parts and percentages are by weight and all temperatures are by degrees Celsius, unless explicitly stated otherwise.

EXAMPLE 1

A high speed, high torque mixer (Premier Caframa high intensity mixer) was employed at a mixing speed of between 500 to 1000 rpm to blend a premixed blend consisting of 40 grams of POLY-TERGENT® 2A1 acid (alkyl diphenylether disulfonate), 3.91 grams water and 8.04 grams 1,2-Aminoethyl-piperazine in order to neutralize the acidity of the alkyl-diphenylether disulfonate to a pH of 6. The blend was mixed in the high torque mixer until it was homogeneous, resulting in an "intermediate blend" containing 77 percent of solids on a dry weight basis.

The same high torque mixer was used at a mixing speed between 500 and 2,000 rpm to mix 30 grams of POLY-TERGENT® SL42 (linear alcohol alkoxylate), and 40 grams of the above 77 percent active component. It was mixed until the blend was totally homogeneous. Barre' and wetting tests showed that the resulting composition provided good dye-leveling and wetting properties against the standard (i.e., POLY-TERGENT 2A1 commercial surfactant), as described in more detail hereinbelow.

EXAMPLE 2

A high speed, high torque mixer (Premier Caframa high intensity mixer) was employed at a mixing speed of between 500 to 1000 rpm to blend a premixed blend consisting of 48 grams POLY-TERGENT® 2A1 acid (Alkyl diphenylether disulfonate), 11.5 grams of monoethanolamine (MEA) to neutralize POLY-TERGENT® 2A1 acid to a pH of 6. The blend was then mixed in the high torque mixer until it was homogeneous. The resulting "intermediate blend" contained 83.4 percent of solids on a dry weight basis.

The same high torque mixer was used at a mixing speed between 500 and 2,000 rpm to mix 30 grams POLY-TERGENT® SL42 (linear alcohol alkoxylate), and 40 grams of the above 83.4 percent active component. The blend was mixed until it was totally homogeneous. Following homogenizing, the total mixture is placed into a 250 mL flask and rotavapored under a vacuum to drive off all the water in the reaction. This achieved a product containing 100% of the theoretical amount of alkyl diphenylether disulfonates that can be incorporated into the homogeneous mixture containing a linear alcohol alkoxylate as a diluent.

EXAMPLE 3

A high intensity mixer was used to blend a premix of 40 grams of POLY-TERGENT® 2A1 acid (Alkyl diphenylether disulfonate), 3.91 grams water and 8.04 grams 1,2-aminoethyl-piperazine to neutralize 2A1 acid to a pH of 6. It was mixed until it was totally homogeneous and the product is 77 percent active.

A high intensity mixer was used to mix 30 grams of POLY-TERGENT® SL42 surfactant (a linear alcohol alkoxylate), and 40 grams of the above 77 percent active component. It was mixed until it was totally homogeneous. Following homogenizing, the total mixture is placed into a 250 mL flask and rotavapored using a Bughi ROTOVAPOR RE120, under a vacuum to drive off essentially all of the water in the reaction mixture. This achieved a product of 100% alkyl diphenylether disulfonates in a homogeneous mixture with a linear alcohol alkoxylate as a diluent. With this higher level of alkyl diphenylether disulfonate, the blend was tested for performance of Barre' and Draves Wetting, and Surface Tension measurement tests using the test procedures identified as Procedure #1 through Procedure #3 described hereinbelow, in order to determine dye-leveling and wetting properties against a commercial standard. The composition provided excellent performance against the standard (POLY-TERGENT 2A1 commercial surfactant) on the various tests described hereinbelow. In addition, the viscosity of the composition was 1580 Centipoise, as compared to a viscosity of 204 Centipoise for the POLY-TERGENT 2A1 commercial standard.

Procedure #1—Barre' Test

Description of the Test Used

A 10 gram swatch of Tiger cloth is processed in a dye bath with a 40:1 liquor to goods ratio containing 0.12% Tectilon Blue 4RS, 0.12% Tectilon Red 2 BN, 0.18% Tectilon Orange 3G, 0.2% ammonium sulfate, and the dye levelling formulation at a 2% level. The dye bath is adjusted to pH 6 and heated at 1 degree Celsius per minute. The dye bath is then held at the boiling point for 30 minutes. After drying, sample measurements were obtained for lightness (L Value) on the HunterLab ColorQUEST 45/0 Spectrocolorimeter. A total of 6 readings each were averaged on both the dark band and the light band of the Tiger cloth. A ratio comparing the average L Value of the light band to the average L Value of the dark band gave the following results:

| Example 3 Composition | POLY-TERGENT 2A1 (Standard) |
| --- | --- |
| 0.971 | 0.986 |

A ratio of 1.00 represents equal dye spread across the swatch. The above ratios indicate comparable performance in the evenness of dyespread for the dye levelling formulation versus 2A1 across a series of heat settings in Tiger cloth.

Procedure #2

Draves Wetting Test

Evaluation of the wetting property for the dye levelling agent was made according to ASTM D2281-68 (Reapproved 1986). One gram of the dye levelling agent per 500 mL of distilled water was thoroughly mixed in a graduated cylinder. A 3 gram hook was hung on a Nylon 6,6 skein and dropped into the cylinder. Time measurement (in seconds) was started as the skein was released into the solution and stopped when the skein definitely began to sink. Determinations were made in seconds at 75 degrees Fahrenheit for the dye levelling agent against 2A1 and are listed as follows:

| | Example 3 | 2A1 |
| --- | --- | --- |
| 75° F. | 4 | 12 |

The above wetting data indicates that the dye levelling agent of the present invention provides quick wetting in a short time that is better than an industry standard (POLY-TERGENT 2A1 surfactant).

Procedure #3

Surface Tension Measurement

Evaluation of the static and interfacial tension of the dye leveling agent was determined according to ASTM D1331-56 (Reapproved 1986).on a Fisher autotensionmat ®. Sample concentration was 2 grams per liter in distilled water. The second phase component used for the determination of interfacial tension was mineral oil. The following results comparing the dye levelling composition of this example versus POLY-TERGENT 2A1 commercial standard, in dynes/cm:

| | Example 3 Comp | 2A1 |
| --- | --- | --- |
| Static | 27.5 | 29.9 |
| Interfacial | 0.9 | 4.0 |

Surface tension results indicate that the dye leveling agent of the present invention enhances both the hydrophilic (static) and the hydrophobic (interfacial) interaction with water. Therefore, the dye levelling agent of the present invention improves the ability to provide for a more uniform balance between hydrophobic and hydrophilic wetting, relative to the commercial standard, POLY-TERGENT 2A1 surfactant. Low interfacial tension indicates an enhanced ability to clean fiber carpets spot on carpets and any other fiber material related. The above data demonstrates the enhanced low interfacial tension with a low critical micille concentration ("CMC") value for the composition of the present invention, as compared to the industry standard comparisons tested.

What is claimed is:

1. An aqueous composition comprising a dyeing effective amount of a dye, a dye-leveling concentrate plus additional water, said concentrate being present in said composition in an amount of between about 0.01 weight percent and about 50 weight percent, based upon the weight of said composition, said dye-leveling concentrate consisting essentially of:
    (a) a dye-leveling agent selected from the group consisting of piperazine-, piperazinone-, and amine-substituted organosulfonates, and combinations thereof,
    (b) an alcohol alkoxylate diluent, or a combination thereof, and
    (c) water,
wherein the amount of component (a) is between about 40% and about 80%, the amount of component (b) is between about 10% and about 55%, and the amount of component (c) is between about 2% and about 20%, all percents being by weight based upon the weight of the aqueous dye-leveling composition concentrate.

2. A composition useful for dyeing fibers comprising (a) a dyeing effective amount of a dye and (b) a dye-leveling agent consisting essentially of:
    (i) the reaction product of a piperazine compound, piperazinone compound, amine compound, or a combination thereof, with an alkyl diphenyl ether sulfonic acid, and
    (ii) an alcohol alkoxylate.

3. The composition of claim 2 wherein the aralkyl ether sulfonate is selected from the group consisting of alkylated diphenyl oxide sulfonates having at least one alkyl-substitution on a phenyl ring and wherein said alkyl-substitution is selected from the group consisting of linear, branched, and cyclic alkyl substitutions, and combinations thereof.

4. The composition of claim 2 wherein the piperazine compound is selected from the group consisting of: 1,2-aminoethyl piperazine, 1,4-piperazinediethane sulfonic acid, anhydrous piperazine, hydrated piperazine, and combinations thereof.

5. The composition of claim 2 wherein the amine is selected from the group consisting of monoethanolamine, triethanolamine, ammonium hydroxide, and combinations thereof.

6. A composition useful for dyeing fibers comprising (a) a dyeing effective amount of a dye and (b) a dye-leveling agent comprising:
  (i) a reaction product of a piperazinone compound, or a combination thereof, and
  (ii) an alcohol alkoxylate,
wherein the piperazinone compound is selected from the group consisting of 2-piperazinones, and combinations thereof.

7. The composition of claim 6 wherein the 2-piperazinone compound is selected from the group consisting of 4-(2-hydroxyethyl)-2-piperazinone, N,N-dimethyl-2-piperazinone, and combinations thereof.

* * * * *